(12) United States Patent
Sato

(10) Patent No.: US 10,271,026 B2
(45) Date of Patent: Apr. 23, 2019

(54) PROJECTION APPARATUS AND PROJECTION METHOD

(71) Applicant: CASIO COMPUTER CO., LTD., Shibuya-ku, Tokyo (JP)

(72) Inventor: Futoshi Sato, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/663,259

(22) Filed: Jul. 28, 2017

(65) Prior Publication Data

US 2018/0091786 A1 Mar. 29, 2018

(30) Foreign Application Priority Data

Sep. 23, 2016 (JP) .................................. 2016-185418

(51) Int. Cl.
| | |
|---|---|
| *H04N 9/31* | (2006.01) |
| *G06F 3/00* | (2006.01) |
| *G06F 3/01* | (2006.01) |
| *G03B 21/26* | (2006.01) |
| *G06F 3/042* | (2006.01) |
| *G06F 3/0484* | (2013.01) |

(52) U.S. Cl.
CPC ............ *H04N 9/3179* (2013.01); *G03B 21/26* (2013.01); *G06F 3/005* (2013.01); *G06F 3/011* (2013.01); *G06F 3/017* (2013.01); *G06F 3/0425* (2013.01); *G06F 3/0426* (2013.01); *G06F 3/04845* (2013.01); *H04N 9/3194* (2013.01)

(58) Field of Classification Search
CPC .......... G06F 3/005; G06F 3/011; G06F 3/017; H04N 9/3179; H04N 9/319

USPC .......................................... 345/156, 426, 589
See application file for complete search history.

(56) References Cited

U.S. PATENT DOCUMENTS

| | | | |
|---|---|---|---|
| 7,829,835 B2 | 11/2010 | Hirai | |
| 2005/0259150 A1* | 11/2005 | Furumi | G09F 21/06 348/144 |

(Continued)

FOREIGN PATENT DOCUMENTS

| | | |
|---|---|---|
| CN | 1707584 A | 12/2005 |
| CN | 103676427 A | 3/2014 |
| JP | 2008292570 A | 12/2008 |

OTHER PUBLICATIONS

Chinese Office Action dated Dec. 20, 2018 (and English translation thereof) issued in counterpart Chinese Application No. 201710637101.3.

*Primary Examiner* — Tony O Davis
(74) *Attorney, Agent, or Firm* — Holtz, Holtz & Volek PC

(57) ABSTRACT

A projection apparatus includes a projection unit configured to display an image based on an input signal by a display element, to form an optical image from light provided from a light source passed or reflected by the display element, and to project the formed optical image on a projection target, a photographing unit configured to photograph a region including an image range which is projected by the projection unit, an image recognition unit configured to recognize a person from the image obtained by the photographing at the photographing unit, and a projection control unit configured to change and set an aspect of the image projected by the projection unit based on a result of the recognition at the image recognition unit.

6 Claims, 6 Drawing Sheets

(56) References Cited

U.S. PATENT DOCUMENTS

| | | | |
|---|---|---|---|
| 2007/0249396 A1* | 10/2007 | Nitta | H04M 1/0214 |
| | | | 455/556.1 |
| 2011/0096136 A1* | 4/2011 | Liu | H04N 7/144 |
| | | | 348/14.07 |
| 2014/0063468 A1* | 3/2014 | Narikawa | H04N 9/3111 |
| | | | 353/31 |
| 2017/0094234 A1* | 3/2017 | Takahama | H04N 9/3179 |

* cited by examiner

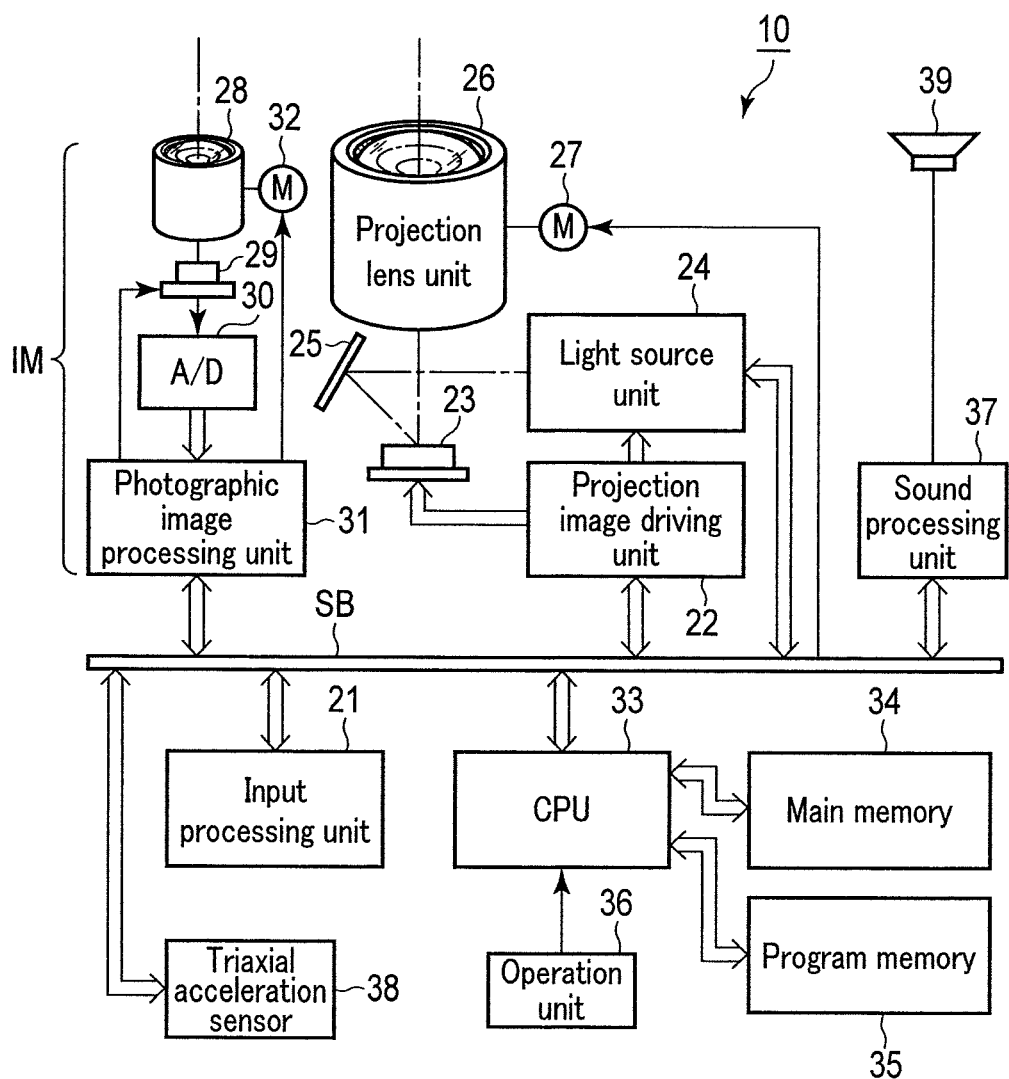
F I G. 1

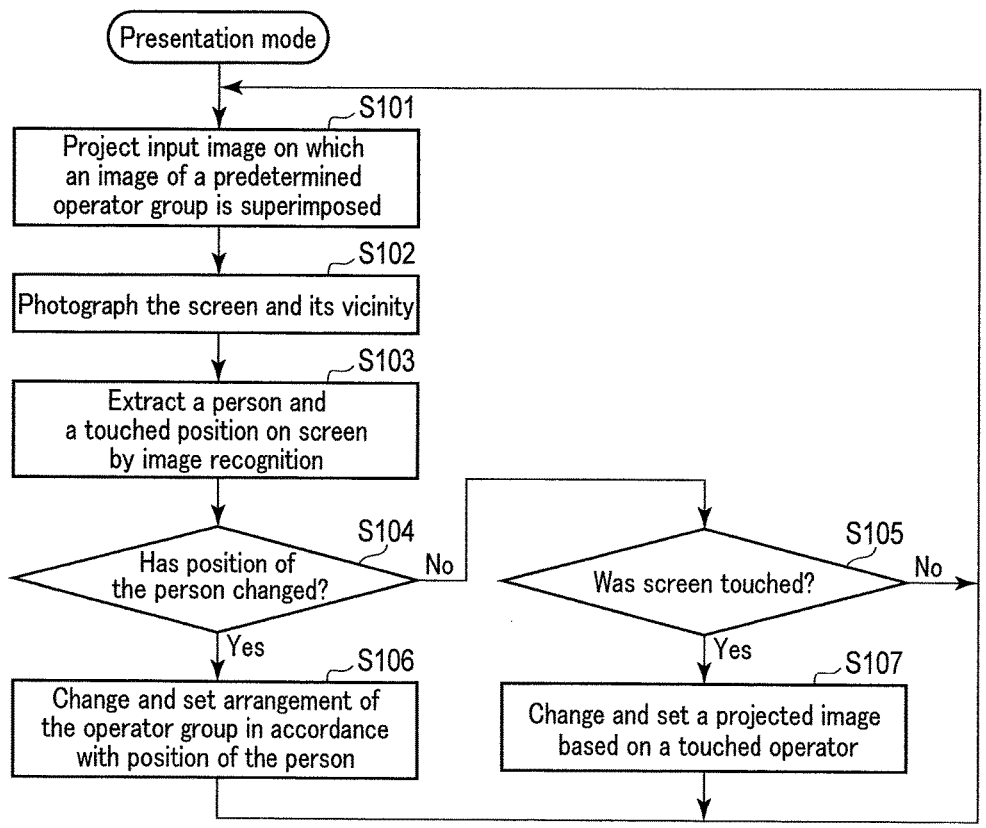
F I G. 2

PROJECTION APPARATUS AND PROJECTION METHOD

CROSS-REFERENCE TO RELATED APPLICATIONS

This application is based upon and claims the benefit of priority from Japanese Patent Application No. 2016-185418, filed Sep. 23, 2016, the entire contents of which are incorporated herein by reference.

BACKGROUND OF THE INVENTION

1. Field of the Invention

The present invention relates to a projection apparatus and a projection method suitable for use in presentations, for example.

2. Description of the Related Art

Jpn. Pat. Appln. KOKAI Publication No. 2008-292570 proposes a technique directed to a projection-type projector having a photographing unit capable of photographing a video projected on a screen through a projection lens, the projector being capable of adjusting a focus of the projected video using the photographing unit, thereby improving accuracy in focus adjustment and simplifying an apparatus configuration.

The above patent literature is directed to a technique for adjusting a focus of a projected video by photographing a video in a region within a range of projection.

In the projector apparatus having a photographing unit of this type, the photographing unit is used as a procedure of detecting a projection state of a projected image targeted by the unit, and performs photographing within the range of a projected image.

On another front, connecting a personal computer to a data projector when giving a presentation is more common in recent years. Some application programs for presentations used in a personal computer has a function of projecting a slide image on which operator symbols (such as "Δ" and "∇") for turning a page are superimposed on a part, for example the left side of the slide image, in accordance with a projector having a photographing unit, so that a page of a projected slide image is turned when a touch operation performed on the operator symbols in the projected image on the screen is recognized from a result of recognizing any foreign object in a photographed image obtained by the photographing unit.

In an application program in which some functions related to advancing a slide projection can be executed without directly operating a personal computer by superimposing operator symbols on a part of the projected image, a person who gives a presentation can be away from the personal computer and present closely to a screen on which slide images are projected. Furthermore, it is possible to give a more natural and convincing presentation to the audience.

However, for example when a different person takes over a presentation due to convenience, etc. for continuing the presentation, if the person who takes over the presentation is present opposite of the side where the operator symbols in the projected image are, the person cannot help covering the projected image when touching the operator symbols, and therefore the operability is very poor.

The present invention has been achieved in view of such circumstances, and an object of the present invention is to provide a projection apparatus and a projection method which are capable of changing a projection aspect of an image in accordance with a person near a screen which is a target for projection.

SUMMARY OF THE INVENTION

According to one aspect of the present invention, there is provided a projection apparatus comprising: a projection unit configured to display an image based on an input signal by a display element, to form an optical image from light provided from a light source passed or reflected by the display element, and to project the formed optical image on a projection target; a photographing unit configured to photograph a region including an image range which is projected by the projection unit; an image recognition unit configured to recognize a person from the image obtained by the photographing at the photographing unit; and a projection control unit configured to change and set an aspect of the image projected by the projection unit based on a result of the recognition at the image recognition unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

FIG. 1 is a block diagram mainly showing the functional arrangement of the electronic circuits of a projector apparatus according to an embodiment of the present invention;

FIG. 2 is a flowchart illustrating the processing details, which is executed mainly by a CPU in the first operation example according to the embodiment;

DETAILED DESCRIPTION OF THE INVENTION

Figure 3A:
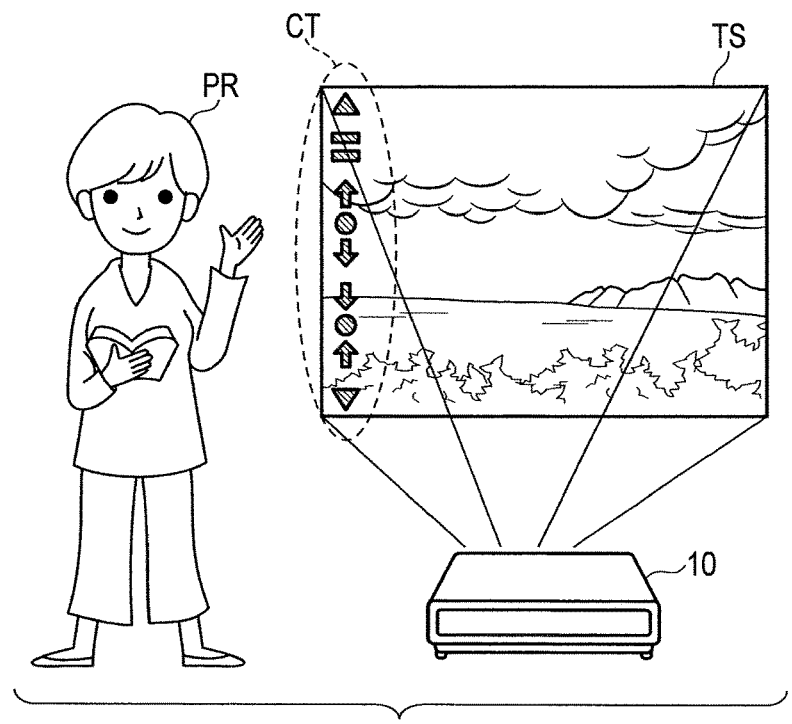
FIGS. 3A and 3B are drawings illustrating a position change of a superimposed image according to the embodiment when a position of a person near a projected image is changed.

An embodiment of a case where the present invention is applied to a projector apparatus will be described in detail below with reference to the accompanying drawings.

[Configuration]

FIG. 1 is a block diagram mainly showing the functional arrangement of the electronic circuits of a projector apparatus 10 according to the present embodiment. In the drawing, the input processing unit 21 consists of, for example, a pin-jack (RCA) type video input terminal, a D-sub15 type RGB input terminal, an HDMI (trademark) (High-Definition Multimedia Interface) terminal, and a USB (Universal Serial Bus) terminal, etc. A digital or analog image signal in various standards that is input to the input processing unit 21, or stored in a USB memory and selectively read therefrom, is sent to a projection image driving unit 22 via the system bus SB after being digitized in the input processing unit 21 as needed. A projection system (a projection unit) 22-27 includes the projection image driving unit 22, a micromirror element 23, a light source unit 24, a mirror 25, a projection lens unit 26, and a lens motor (M) 27.

The projection image driving unit 22 drives the micromirror element 23, which is a display element, to display the sent image data by a more rapid time-divisional drive, which is a result of multiplying a frame rate in accordance with a predetermined format (for example, a multiplication of 120 frames per second if the input image data is in 60 Hz) by the number of color components and the number of grayscale levels to display.

The micromirror element 23 performs a display operation by quickly turning on/off each of the tilt angles of a plurality of micromirrors arranged in an array, for example, 1280 pixels×960 pixels micromirrors (the aspect ratio of the horizontal direction to the vertical direction is 4:3), thereby forming an optical image using the light reflected by the display operation.

On the other hand, light in primary colors (R, G, B) are circularly emitted from the light source unit 24 in a time-divisional manner. The light source unit 24 has an semiconductor LED, and repeatedly emits light in primary colors (R, G, B) in a time-divisional manner. The LED of the light source unit 24 may be an LD (semiconductor laser) and an organic EL element as an LED in a broad sense. This light in a primary color from the light source unit 24 is completely reflected on a mirror 25 and irradiated onto the micromirror element 23.

An optical image is formed by the light reflected by the micromirror element 23, and is then projected and displayed outside via the projection lens unit 26.

The projection lens unit 26 includes, in a lens optical system, a focus lens for moving a focus position and a zoom lens for changing a zoom (projection) view angle, and the positions of these lenses along an optical axis direction are selectively driven by the lens motor (M) 27 via a gear mechanism (not shown).

On the other hand, the present invention provides a photographing unit IM for photographing in a projection direction in the projection lens unit 26. This photographing unit IM includes a photographic lens unit 28. This photographic lens unit 28 includes a zoom lens for changing a photographic view angle and a focus lens for moving a focus position, and has a photographic view angle larger than a projection view angle at which light exits when the projection lens unit 26 is set to have a widest angle, for example an angle twice as large as the projection view angle, so that an image projected by the projection system and a person nearby can be photographed. An external optical image entering the photographic lens unit 28 is formed on a CMOS image sensor 29 serving as a solid state image sensor.

An image signal obtained by image formation in the CMOS image sensor 29 is digitized in an A/D converter 30, and then sent to a photographic image processing unit 31.

This photographic image processing unit 31 performs scanning driving of the CMOS image sensor 29 to execute a photographic operation, thereby performing recognition processing for the outline of a person, particularly the outline of the person's head, by image recognition processing, such as outline extraction and pattern matching for image data obtained by the photographic operation. In addition, the photographic image processing unit 31 drives a lens motor (M) 32 for moving the focus lens position of the photographic lens unit 28.

All the operations on each of the foregoing circuits are controlled by the CPU 33. The CPU 33 is directly connected to a main memory 34 and a program memory 35. The main memory 34 is configured with an SRAM, etc., and functions as a work memory of the CPU 33. The program memory 35 is formed by an electrically rewritable nonvolatile memory, for example, a flash ROM, and stores operation programs executed by the CPU 33, various kinds of standard data, such as OSD (On Screen Display) images, etc. which are superimposed on an image used as a base, and the like.

The CPU 33 reads the operation programs, the standard data, and the like stored in the program memory 35, loads and stores them in the main memory 34, and executes the programs, thereby comprehensively controlling the projector apparatus 10.

The CPU 33 performs various types of projection operations in accordance with operation signals from an operation unit 36. This operation unit 36 includes a light receiving unit for receiving an infrared modulation signal from an operation key included in the main body housing of the projector apparatus 10, or a remote controller (not shown) dedicated for the projector apparatus 10, and accepts a key operation signal and sends a signal corresponding to the accepted key operation signal to the CPU 33.

The CPU 33 is also connected to a sound processing unit 37 and a triaxial acceleration sensor 38 via the system bus SB.

The sound processing unit 37 comprises a sound source circuit, such as a PCM sound source, converts sound signals given at the time of a projection operation, and drives the speaker unit 39 to generate sound, or a beep sound, etc. as needed.

The triaxial acceleration sensor 38 detects acceleration in three axis directions orthogonal to each other, and can determine the attitude of the projector apparatus 10 in which a projection operation is performed, by calculating the direction of the gravity acceleration from the detection output of the triaxial acceleration sensor 38.

More specifically, based on the accelerations around the projection optical axes of the projection units 22 to 27 of the projector apparatus 10, the triaxial acceleration sensor 38 detects an attitude in which the projector apparatus 10 is installed. Furthermore, trapezoid correction processing when assuming that a projection target screen surface is vertical or horizontal can be executed using an attitude angle detected by the triaxial acceleration sensor 38.

Or, even in a case where the projector apparatus 10 is fixed on the ceiling, etc. of the room by attaching the bottom surface of the housing on to the ceiling with not-shown ceiling brackets, the state of the projector apparatus 10 can be recognized by an attitude angle detected by the triaxial acceleration sensor 38, allowing an image to still be projected right side up.

First Operation Example

The first operation example according to the above embodiment will be described next.

An operation in a presentation mode, which is a function unique to the projector apparatus 10, where a synthesized image on which an image of a group of operator symbols for a slide page turning operation and a pausing operation is superimposed using an image as a base, which is input to the input processing unit 21 and is based on a slide image signal for a presentation program, will be explained.

FIG. 2 is a flowchart illustrating the details of projection processing in the presentation mode, which is executed mainly by the CPU 33. The CPU 33 at the beginning of processing has the projection image driving unit 22 generate, for image data that is input from the input processing unit 21, a synthesized image on which an image of a group of operators is superimposed in accordance with a direction which is set at that time (if the processing starts immediately after a projection operation of the projector apparatus 10 is started, the direction which was set at the time when a previous projection operation was finished), and has the projection system 22-27 project the synthesized image (step S101).

Concurrently, the CPU 33 has the photographing unit IM photograph an image around projected by the projection system 22-27 and its vicinity (step S102).

At this time, in the photographing unit IM, the zoom lens of the photographic lens unit 28 is adjusted by the photographic image processing unit 31, using the lens motor 32 in accordance with a position of the zoom lens in the projection lens unit 26, in such a manner that a photographic view angle becomes twice as large as the projection view angle at the time; moreover, the position of the focus lens of the photographic lens unit 28 is adjusted by the photographic image processing unit 31, using the lens motor 32 in accordance with the position of the focus lens in the projection lens unit 26, in such a manner that the lens will be in the in-focus range slightly before the range so as to include a projection distance at the time.

The photographing unit IM performs image recognition processing including outline extraction processing and pattern matching processing for a photographed image obtained under the control of the CPU 33, and extracts the position of the projected image, and the entire outline of a person who is present around the projected image, and whether or not the person touches an edge of the projected image by their fingers (step S103).

The CPU 33 determines whether or not the position of the extracted person is changed compared to the last projection, using the image recognition result (step S104).

Herein, if it is determined that the position of the person is not changed from the last projection because the extracted person is in a predetermined range ("No" in step S104), the CPU 33 determines whether or not a person who is extracted next touches an edge of the projected image by their fingers (step S105).

If it is determined that the person does not touch an edge of the projected image ("No" in step S105), the CPU 33 returns to the processing in step S101 and continues the projection operation.

FIG. 3A is a drawing illustrating a state when a slide image for presentation is projected from the projector apparatus 10 on a screen TS and a presenter PR gives an explanation standing on the left side of the screen. As shown in FIG. 3A, synthesized projection is carried out by superimposing an image of a group of operator symbols CT for instructing to turn a page of the slide image, etc. on the left side of the projected image where the presenter PR is present.

In step S104, if it is determined that the position of the extracted person is changed compared to the last projection because the person is present in a range different from that of the last projection ("Yes" in step S104), the CPU 33 instructs the projection image driving unit 22 to change and set the position of the group of operator symbols CT in the image to a projection position corresponding to the position of the extracted person (step S106), and then returns to the process in step S101.

Figure 3B:
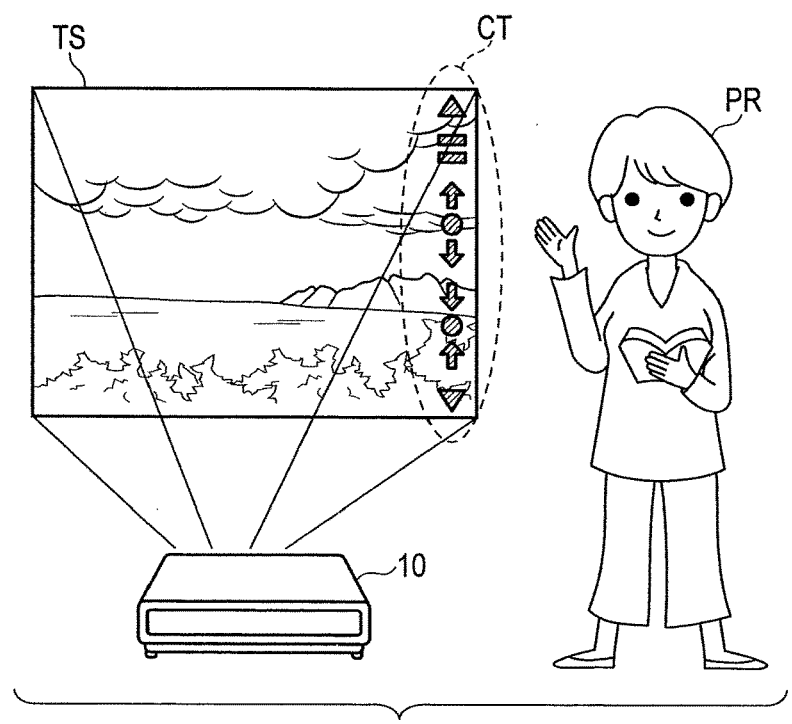

FIG. 3B is a drawing illustrating a state where the presenter PR moves to the right side of the projected image from the position illustrated in FIG. 3A and continues the presentation. As shown in FIG. 3B, an image of a group of operator symbols CT for instructing to turn a page of the slide image, etc. is moved and superimposed on the right side of the projected image where the presenter PR is present to carry out synthesized projection.

In step S105, if it is determined that the person extracted from the photographed image touches an edge of the projected image with their fingers ("Yes" in step S105), the CPU 33 determines an operator at the touched position, and performs a change setting to the slide image data that is input from the input processing unit 21 in accordance with a determination result to change the projected image to an appropriate one (step S107), and then returns to the processing in step S101.

Thus, if the position of a person who is present in the vicinity of an image being projected is changed, the position of an image superimposed on the projected image follows the moved position; thus, it is possible to maintain an environment that allows a person to continue the operation without covering up the projected image in a case where a function that can be operated by a person, like a group of operator symbols CT, is provided.

Second Operation Example

The second operation example according to the above embodiment will be described next.

In the operation example, the pixel configuration of the micromirror element 23 is 1280 pixels in the horizontal direction×960 pixels in the vertical direction, and its aspect ratio is 4:3 as described above, whereas the image data that is input from the input processing unit 21 is for projecting an image having the aspect ratio of 16:9.

In this case, if in a normal projection mode, a predetermined range on each of the upper edge side and the lower edge side of an optical image formed by the micromirror element 23 is set as a black image in which no projection is carried out.

In this operation example, an operation performed when the projector apparatus 10 is in a presentation mode will be explained.

Figure 4:
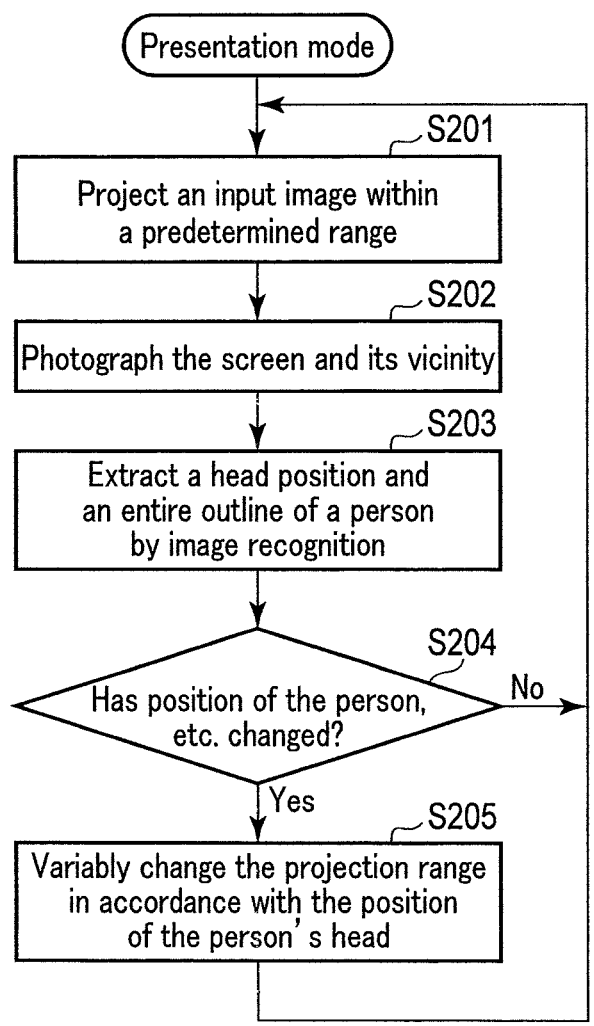
FIG. 4 is a flowchart illustrating the processing details, which is executed mainly by a CPU in the second operation example according to the embodiment.

FIG. 4 is a flowchart illustrating the details of projection processing in the presentation mode, which is executed mainly by the CPU 33. The CPU 33 at the beginning of processing has the projection image driving unit 22 generate, for image data that is input from the input processing unit 21, synthesized image data on which an image of a group of operators is superimposed in accordance with a range of the micromirror element 23 that is set at that time (if the processing starts immediately after a projection operation of the projector apparatus 10 is started, the range that was set at the time when a previous projection operation was finished), and has the projection image driving unit 22 execute a display operation at the micromirror element 23 to project the image with the projection system 22-27 (step S201).

Concurrently, the CPU 33 has the photographing unit IM photograph an image around projected by the projection system 22-27 and its vicinity (step S202).

At this time, in the photographing unit IM, the zoom lens of the photographic lens unit 28 is adjusted by the photographic image processing unit 31, using the lens motor 32 in accordance with a position of the zoom lens in the projection lens unit 26, in such a manner that a photographic view angle becomes twice as large as the projection view angle at the time; moreover, the position of the focus lens of the photographic lens unit 28 is adjusted by the photographic image processing unit 31, using the lens motor 32 in accordance with the position of the focus lens in the projection lens unit 26, in such a manner that the lens will be in the in-focus range slightly before the range so as to include a projection distance at the time.

The photographing unit IM performs image recognition processing including outline extraction processing and pattern matching processing for a photographed image obtained under the control of the CPU 33, and extracts the position of the projected image, and the entire outline of a person who is present around the image being projected (step S203).

The CPU 33 determines whether or not the position of the extracted person is changed compared to the last projection, using the image recognition result (step S204).

Herein, if it is determined that the position of the extracted person is not changed compared to that in the last projection ("No" in step S204), the CPU 33 returns to the processing in step S201 and continues the projection operation.

Figure 5A:
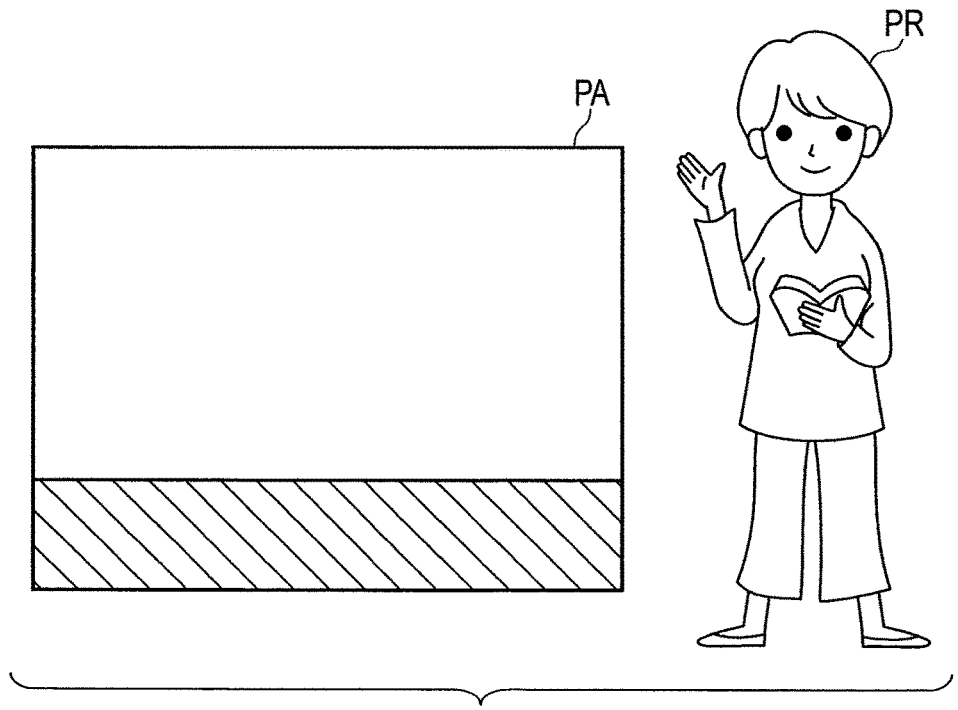
FIGS. 5A and 5B are drawings illustrating a position change of a projected image according to the embodiment when a position of a person near a projected image is changed.

FIG. 5A is a drawing illustrating a state when a slide image for presentation is projected from the projector apparatus 10, shifting to the upper side of the projectable range PA on the screen, and a presenter PR gives an explanation standing on the right side of the projectable range PA.

As shown in FIG. 5A, in a case where a presenter PR is tall relative to the projectable range PA, and the head of the presenter PR is at a position higher than the upper edge of the projectable range PA, the CPU 33 displays an image being shifted on the upper side of the pixel configuration of the micromirror element 23, and instructs the projection image driving unit 22 to set a black image region on the lower side for which no projection is performed, thereby having the projection system 22-27 execute projection.

In step S204, if it is determined that the position of the extracted person is changed compared to that in the last projection ("Yes" in step S204), the CPU 33 again instructs a change setting at the projection image driving unit 22 to change the position of the projected image within the projection range PA, particularly in accordance with the head position within the entire body outline (step S205), and then returns to the process in step S201.

Figure 5B:
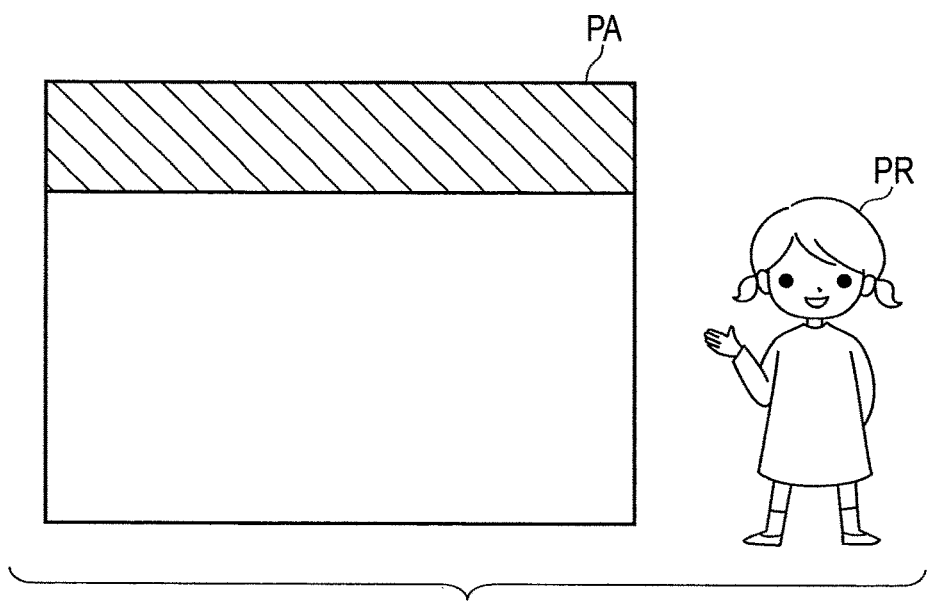

FIG. 5B is a drawing illustrating a state where the presenter PR is changed from the state illustrated in FIG. 5A to continue the presentation. As shown in FIG. 5B, in a case where a presenter PR is short relative to the projectable range PA, and the head of the new presenter PR is at a position closer to the center than to the upper side of the projectable range PA, the CPU 33 displays an image being shifted to the lower side of the pixel structure of the micromirror element 23, and instructs the projection image driving unit 22 to set a black image region on the upper side for which no projection is performed, thereby having the projection system 22-27 execute projection.

In the present operation example, a position of a black region, which is set when the aspect ratio of the projectable range PA and an aspect ratio of an image that is actually projected are different from each other, is controlled in a manner as described above in accordance with the position of the presenter PR, particularly the position of the head that is recognized from the entire body outline.

Thus, when the presenter PR visually identifies an image projected in the projectable range PA on the screen, it is possible to keep an angle in which the head is moved up and down to a minimum, thereby providing a more natural presentation environment.

In the above operation example, the pixel configuration of the micromirror element 23 is 1280 pixels in the horizontal direction×960 pixels in the vertical direction, and its aspect ratio is 4:3 as described above, whereas the image data that is input from the input processing unit 21 is for projecting an image with the aspect ratio of 16:9; however, a case where the aspect ratio of the pixel configuration of the micromirror element 23 is 16:9, but an imaging the aspect ratio is 4:3 will be briefly explained in the following.

In this case, if in a normal projection mode, a predetermined range on each of the left edge side and on the right edge side of an optical image formed by the micromirror element 23 is set as a black image in which no projection is carried out.

Figure 6A:
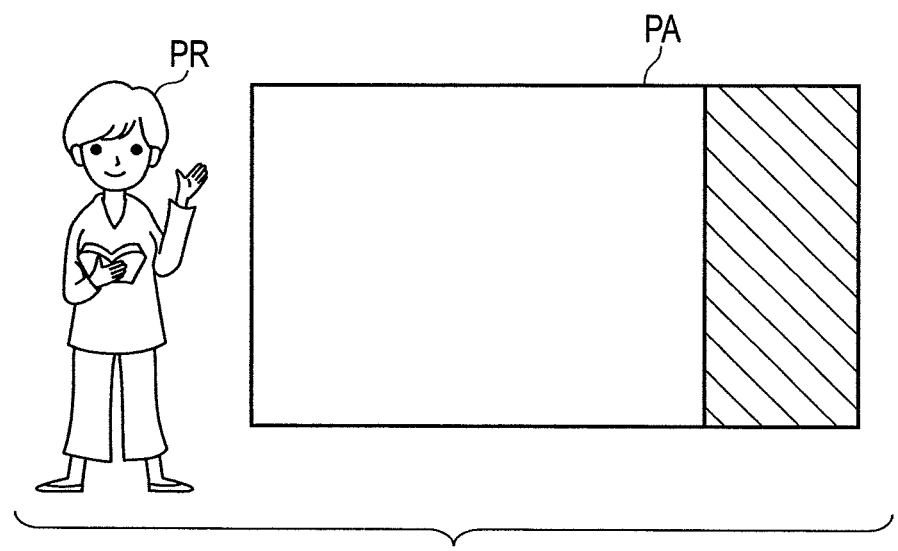
FIGS. 6A and 6B are drawings illustrating a position change of a projected image according to the embodiment when a position of a person near a projected image is changed.
Figure 6B:
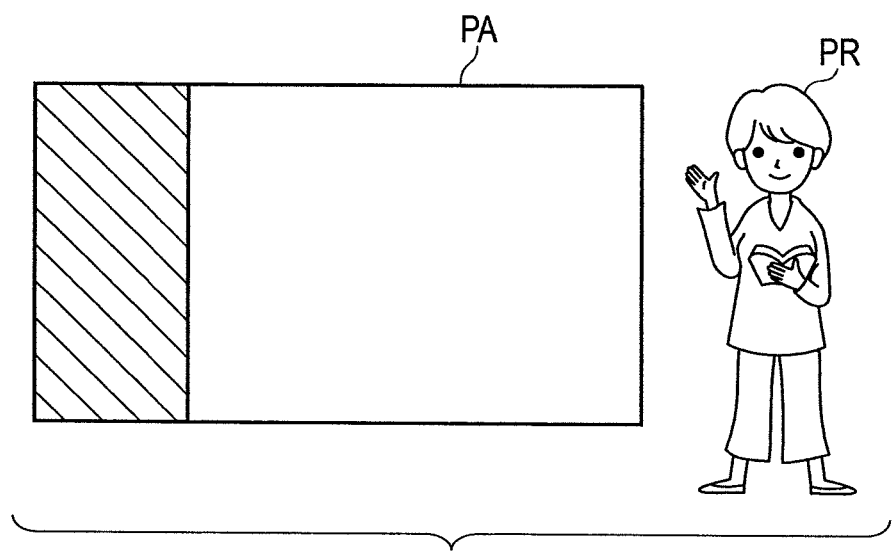

In this operation example, assume projection control as illustrated in FIG. 6A and FIG. 6B is performed.

FIG. 6A is a drawing illustrating a state when a slide image for presentation is projected from the projector apparatus 10, shifting to the left side of the projectable range PA on the screen, and a presenter PR gives an explanation standing on the left side of the projectable range PA.

As illustrated in FIG. 6A, since the presenter PR is not on the right or left side of the projectable range PA, in other words, at a position off of the projectable range PA, the CPU 33 displays an image to the left side of the pixel configuration of the micromirror element 23, and instructs the projection image driving unit 22 so as to set a black image region for which projection is not performed on the right side, thereby having the projection system 22-27 execute projection.

On the other hand, FIG. 6B is a drawing illustrating a state when a slide image for presentation is projected from the projector apparatus 10, shifting to the right side of the projectable range PA on the screen, and a presenter PR gives an explanation standing on the right side of the projectable range PA.

As illustrated in FIG. 6B, since the presenter PR is not on the right or left side of the projectable range PA, in other words, at a position off of the projectable range PA, the CPU 33 displays an image to the right side of the pixel configuration of the micromirror element 23, instructs the projection image driving unit 22 so as to set a black image region for which projection is not performed on the left side, thereby having the projection system 22-27 execute projection.

Thus, when the aspect ratio of the projectable range and that of an image that is to actually be projected are different, but a black image region in which no projection is performed needs to be set somewhere, arrangement of such a black image region can be automatically set in accordance with the position of a person who is present near the projected image or the height of the head of the person, thereby achieving a more natural image projection.

According to the present embodiment described in detail in the above, it is possible to change a projection aspect of an image in accordance with a direction in which a person near a screen, which is a projection target, is present.

Note that in the above embodiment, the present invention has been explained by exemplifying a DLP (trademark) type projector using a semiconductor light emitting element; however, the present invention is not intended to limit the projection method and the light emitting element, etc. of a light source unit, and is equally applicable to a projector, and the like which uses a high pressure mercury vapor lamp as a light source and a transmission color liquid crystal panel as a display element.

Other than the above, the present invention is not limited to the above-described embodiments, and can be modified in various manners in practice when implementing the invention without departing from the gist of the invention. The functions carried out by the foregoing embodiments may be realized in a combination to the greatest extent possible. The above-described embodiments include various stages, and a variety of inventions can be derived by properly combining structural elements disclosed in connection with the embodiments. For example, if the advantages of the invention are attained even after some of the structural elements disclosed in connection with the embodiments are deleted, the structure made up of the resultant structural elements can be extracted as an invention.

What is claimed is:

1. A projection apparatus comprising:
a projection unit configured to display an image based on an input signal by a display element, to form an optical image from light provided from a light source passed or reflected by the display element, and to project the formed optical image on a projection target, the formed optical image being a synthesized image on which an image is superimposed on a part of another image which is used as a base;
a photographing unit configured to photograph a region including an image which is projected by the projection unit;
an image recognition unit configured to recognize a person from the image obtained by the photographing by the photographing unit; and
a projection control unit configured to change and set a position of the superimposed image in the synthesized image projected by the projection unit based on a position of the person recognized by the image recognition unit.

2. The projection apparatus according to claim 1, wherein:
an aspect ratio of an image based on the input signal and an aspect ratio of an image that can be displayed by the display element are different, and
the projection control unit is configured to change and set an aspect of the image projected by the projection unit based on the position of the person recognized by the image recognition unit, the aspect ratio of the image based on the input signal, and the aspect ratio of the image that can be displayed by the display element.

3. The projection apparatus according to claim 1, wherein the image recognition unit is configured to recognize at least one of a position of a head of the person recognized by the image recognition unit, an entire outline of the person, and a positional relationship of the person and the image projected by the projection unit.

4. The projection apparatus according to claim 2, wherein the image recognition unit is configured to recognize at least one of a position of a head of the person recognized by the image recognition unit, an entire outline of the person, and a positional relationship of the person and the image projected by the projection unit.

5. A projection method for an apparatus including a projection unit configured to display an image based on an input signal by a display element, to form an optical image from light provided from a light source passed or reflected by the display element, and to project the formed optical image on a projection target, the formed optical image being a synthesized image on which an image is superimposed on a part of another image which is used as a base; and a photographing unit configured to photograph a region including an image which is projected by the projection unit, the method comprising:
recognizing a person from the image obtained by the photographing by the photographing unit; and
changing and setting a position of the superimposed image in the synthesized image projected by the projection unit based on a position of the recognized person.

6. A projection apparatus comprising:
a projection unit configured to display an image based on an input signal by a display element, to form an optical image from light provided from a light source passed or reflected by the display element, and to project the formed optical image on a projection target;
a photographing unit configured to photograph a region including an image which is projected by the projection unit;
an image recognition unit configured to recognize a person from the image obtained by the photographing by the photographing unit; and
a projection control unit configured to, when an aspect ratio of an image based on the input signal and an aspect ratio of an image that can be displayed by the display element are different, change and set a position of the projected image within a projection range of the projection unit based on a position of the person recognized by the image recognition unit, the aspect ratio of the image based on the input signal, and the aspect ratio of the image that can be displayed by the display element.

* * * * *